United States Patent [19]
Liston

[11] Patent Number: 5,185,662
[45] Date of Patent: Feb. 9, 1993

[54] METHOD AND APPARATUS FOR PRODUCING COPY WITH SELECTIVE AREA TREATMENT

[75] Inventor: Christopher B. Liston, Rochester, N.Y.

[73] Assignee: Eastman Kodak Company, Rochester, N.Y.

[21] Appl. No.: 646,124

[22] Filed: Jan. 28, 1991

[51] Int. Cl.⁵ .............................................. H04N 1/40
[52] U.S. Cl. ...................................... 358/78; 358/471
[58] Field of Search ................. 358/78, 80, 471, 160, 358/183, 76, 447-448, 452; 340/723

[56] References Cited

U.S. PATENT DOCUMENTS

| | | | |
|---|---|---|---|
| 4,617,596 | 10/1986 | Yoshida et al. | 358/280 |
| 4,656,524 | 4/1987 | Norris et al. | 358/76 |
| 4,734,789 | 3/1988 | Smith et al. | 358/300 |
| 4,825,296 | 4/1989 | Wagensonner et al. | 358/78 |
| 4,829,370 | 5/1989 | Mayne et al. | 358/78 |

*Primary Examiner*—Stephen Brinich
*Attorney, Agent, or Firm*—Norman Rushefsky

[57] ABSTRACT

A copier system includes an editing station for providing editing information. The station includes a scanner for scanning a document at high resolution and a display for displaying the scanned document at low resolution. Upon identification of the area of interest for editing the designated area is displayed at a higher resolution on the display. Editing information is then created using the display and the document copied on a copier with copies modified in accordance with the editing information.

8 Claims, 2 Drawing Sheets

METHOD AND APPARATUS FOR PRODUCING COPY WITH SELECTIVE AREA TREATMENT

FIELD OF THE INVENTION

The invention relates to editing copy using electrophotographic copiers and, more particularly, to a method and apparatus for editing a document for copying with selective area treatment.

DESCRIPTION OF THE PRIOR ART

In U.S. Pat. No. 4,734,789 an electrophotographic copier is described with an editing capability. At a remote workstation a digitizing tablet is provided for allowing an operator to designate one or more areas of a document sheet for selective area treatment or image editing, such as erasure, etc. After the area is designated and the particular treatment selected using a wand associated with the digitizing tablet, the document is placed on the copier platen. Data signals representing the area selected and the designated selected area treatment are stored on a portable memory device and inserted into the copier. The copier reads the data from the memory device, and the reproduction of the document is controlled so as to reproduce a copy thereof that is edited according to the inputs provided by the operator at the remote station. In order to facilitate editing, the prior art, as suggested in U.S. Pat. No. 4,617,596, notes that an editing station may have a CRT screen for viewing a document and allowing the operator to designate an area for editing using a digitizing tablet and viewing the edited area to confirm the data input via the wand. The latter patent recognizes that the CRT device is only capable of displaying the entire image of the document sheet as a low resolution display. In order to provide a higher resolution display of the document, a separate soft display printer is provided for viewing the entire document sheet as a high resolution display. The provision of an extra display entails additional expense.

It is, therefore, an object of the invention to provide for an improved apparatus and method for editing a document to be copied.

SUMMARY OF THE INVENTION

These and other objects of the invention are realized by a data editing station and method for editing data for a copier, the station comprising scanner means for scanning a document to be edited at a high resolution, memory means for storing the scanned data at a first high resolution, a display for displaying the data at a second lower resolution, memory means for storing the data for display at the lower resolution, means for designating an area on the display for selective editing, means responsive to a designation of an area for extracting data specific to said area from said high resolution memory means and modifying said data for viewing on said display at a higher resolution than said second resolution, means for adjusting data in said designated area for editing, and means for storing said adjusted data.

DESCRIPTION OF THE PREFERRED EMBODIMENT

Figure 1:
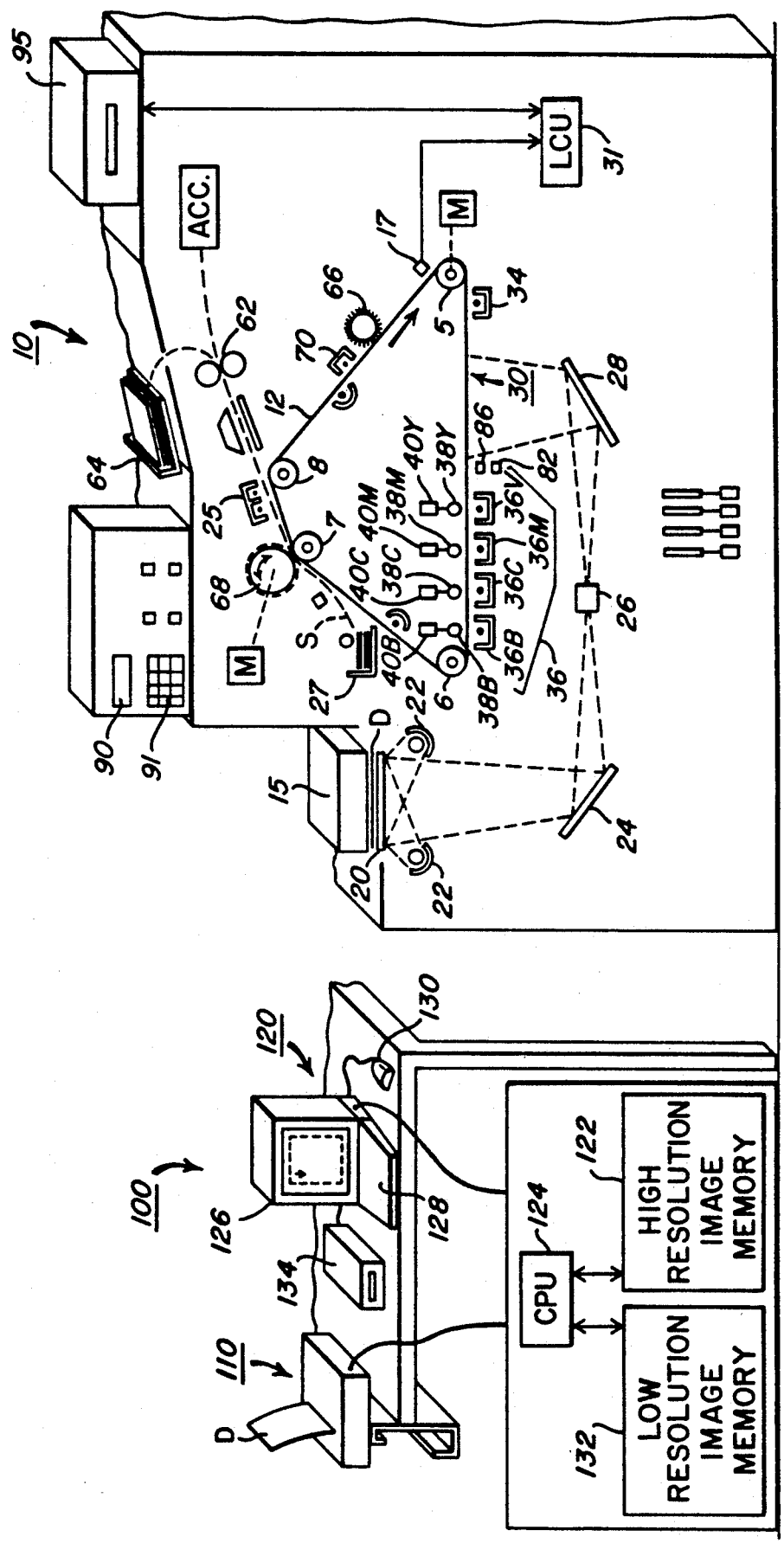
FIG. 1 is a schematic of a copier and remote document editing station to be used with the copier.

With reference to FIG. 1 there is shown an electrophotographic copier apparatus 10 that includes a transparent glass platen 20 for supporting a document sheet for exposure. Flash lamps 22 are energized by a suitable power supply, not shown, in response to a signal from the copier logic and control unit (LCU) 31 to illuminate the document. The LCU provides various control signals for operating the copier to produce copy in accordance with signals provided thereto by the various stations as well as one or more encoders 17 that detect movements of belt 12. The image from the illuminated document is reflected from a first mirror 24 through a lens 26 to a second mirror 28 and projected onto a surface of a photoconductive belt 12. The surface includes a uniform electrostatic charge thereon that is provided by a corona charger 34. This charge is modulated by the exposure to provide an electrostatic latent image. A series of rollers 5, 6, 7 and 8, one of which, 5, may be driven by a motor to thereby entrain the belt 12 and drive same in the direction shown by the arrow so the belt is caused to move past the various workstations to be described. In addition to the charging station 34 and exposure station 30 described, the copier has situated about the belt one or more development stations 36 for developing the respective electrostatic latent images in a respective color using an electroscopic pigmented toner. The plural stations are provided where a document is to be reproduced so that a copy is in more than one color or the copy is reproduced in a selected different color from the original. After the development station, a transfer station is provided for transferring one or more color images onto a receiver sheet S. A source of copy sheets may be provided in a tray 27 and a top one of said sheets fed out in timed relationship with movement of a developed image frame of belt 12. Feed rolls may be employed to advance sheet S into the nip formed by a motor driven transfer roller 68 and the belt 12. The transfer roller may be charged to a suitable potential to attract toner on the image frame of belt 12 to the receiver sheet S to transfer the image thereto. A vacuum source may be provided to retain the sheet on the transfer roller 68 in the event that multiple images from more than one image frame are transferred to the sheet. After transfer of the developed image(s) to the surface of copy sheet S, the sheet follows the belt and exits at a fusing station wherein a pair of rollers 62, one of which is heated, fuse the image to the sheet as the sheet is transported between them and exits the copier. The belt, in turn, is cleaned by suitable conventional means such as a cleaning charger 70 and brush 66 for reuse for additional image formation for subsequent copies. In addition, an LED printhead 82 or other electro-optical exposure surface is provided for selective editing, as will be described below. A gradient index lens array 86 may be provided for focusing the light from the LED's. Further details regarding a copier of this type are described in U.S. Pat. No. 4,791,450, the contents of which are incorporated by this reference. A copier providing selective area editing wherein halftone screening areas is provided is disclosed in U.S. Pat. No. 4,740,818, the pertinent contents of which are incorporated herein by this reference.

The cover of the platen may be provided with a recirculating feeder 15 for feeding a plurality of document sheets, D, generally to the exposure platen for reproduction and then back to a stack forming a supply of originals. In addition, a display 90 is provided and keys 91 for inputting various functions and quantities to the copier for copying. A disk drive 95 is also provided into which a magnetic data storage device such as a floppy disk may be inserted for use in editing a reproduction of a document.

At a remote station 100, a document sheet editor is provided that includes a scanner for reading image data upon a document sheet. Typical scanners may scan a document at, say, 300 picture elements (pixels) per inch with 300 lines per inch resolution. This relatively high resolution of reading will generate electronic data signals representing the image on the document sheet and such may be stored in a high resolution memory store 122 that has sufficient capacity for storing, say, $8.4 \times 10^6$ bits of data that may be derived from a sheet of, say, $8\frac{1}{2}'' \times 11''$. The high resolution data may be stored in a compressed form using a suitable compression algorithm but is substantially retrievable back to high resolution form using an expansion algorithm.

The remote station further includes a word processor 120, including a computer controller (CPU) that controls the scanner 110, the high resolution memory store 122, a CRT display 126, a keyboard control and data input 128, a mouse 130 and a low resolution memory store 132 that provides the memory for the image being displayed upon the CRT display and a disk drive 134. After an image from a document sheet is scanned by scanner 110 and signals representing the image data thereon generated, the image data stored in the high resolution store 122. The image thereof may be displayed automatically or by entry of an appropriate command from the keyboard 128. At this point the CPU proceeds through an appropriate algorithm to transform the high resolution image data to a lower resolution for display. For example, blocks of, say, $10 \times 10$ adjacent pixels may be averaged and compared with a threshold to form a lower resolved image of the high resolution data stored in memory. Of course, other algorithms may be employed for reducing this data, including deleting of lines, etc. With the data for the low resolution image stored in memory store 132, the low resolution may be displayed on the CRT. The operator may then call up the editing mode using the keyboard 128 which selects an appropriate resident editing program stored in the memory of the CPU.

Figure 2:
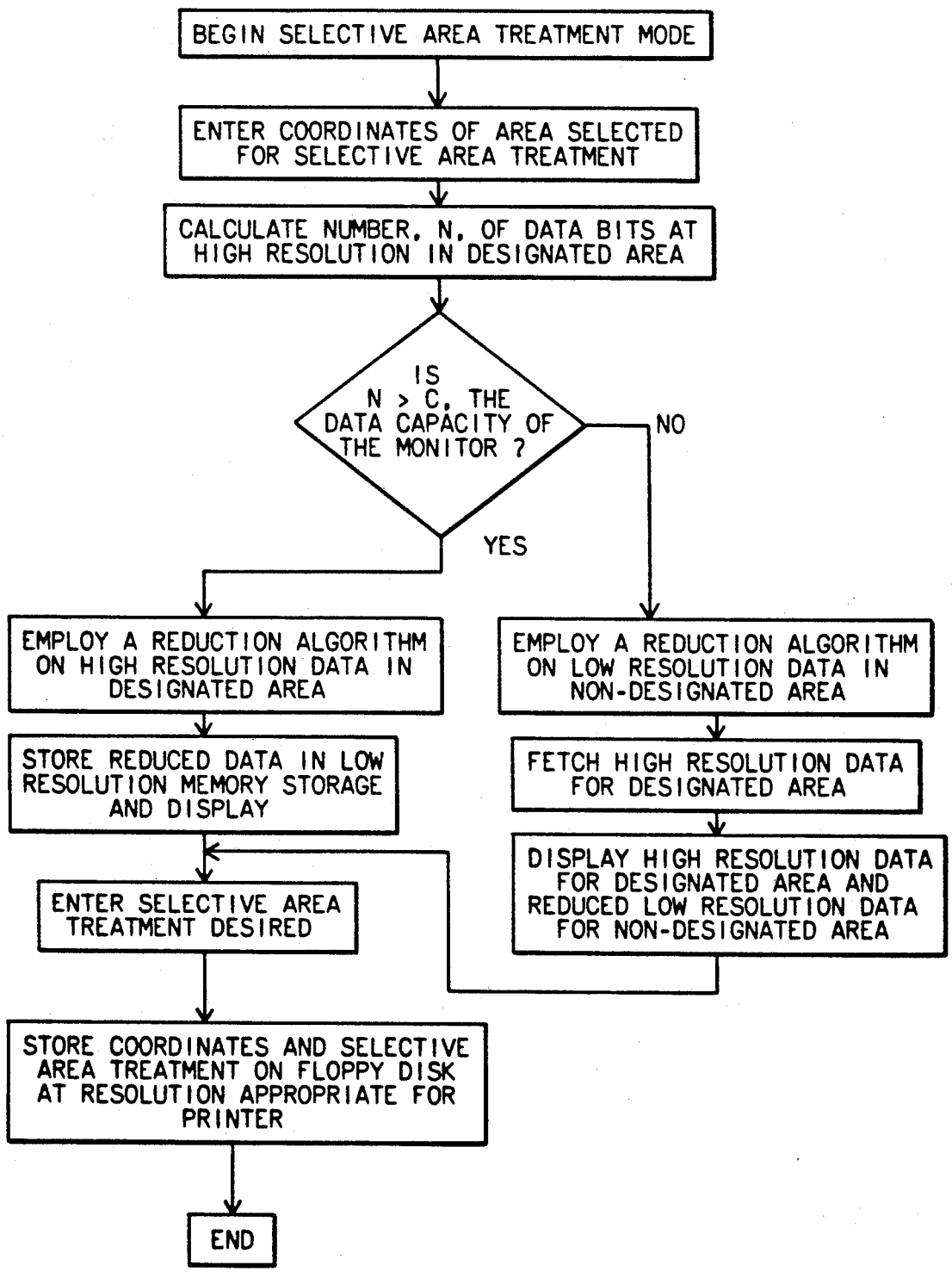
FIG. 2 is a flow chart for use by the computer controller of the remote document editing station.

With reference now to the flow chart of FIG. 2, this program prompts the operator through a prompt provided on the CRT display 126 to enter the coordinates of the area to be selected for editing. Through use of the mouse, a cursor on the screen may be moved to define, say, a rectangle by, say, inputting the diagonal points thereof using the mouse. Other shapes may also be designated.

With selection of the coordinates of the area to be edited, the editing program calculates the area selected and the highest number of data bits that can fit into this area using the display resolution that is identical with that of the data stored in the high resolution image memory. The CPU then enters the high resolution memory and, in particular, the area thereof defined by the coordinates of the selected area and extracts data from this area of the original document, D, that was scanned and processes same at a sufficient resolution that relates the total resolution of the CRT to the number of data bits in the selected area at high resolution. Thus, if the ratio is 25 percent, each block of four pixels in the edited area at high resolution are averaged and compared with a threshold to define for the selected area a higher resolution image of the edited area than that previously displayed on the CRT. This higher resolution data is stored in the CRT's memory store 132 and displayed on the CRT. If there is sufficient capacity in the CRT's memory, the area outside may also be displayed but at a reduced resolution from the normal low resolution that it was viewed initially.

With the area of interest now available for editing with more clarity the operator may select one or more areas within the original designated area for selective erase, selective coloring, etc. In addition, the word processing program, as well as a drawing program, may be used to add characters or graphic material to the area.

After editing is accomplished, the data stored in low resolution memory 132 is transferred to a floppy disk or other portable memory device located in the disk drive 134. In doing this, the data is translated to a format suitable for printing by the LED printer at, say, 128 dots per inch, the resolution of the printer. The disk is then inserted in the disk drive 95 associated with the copier.

In accordance with signals provided by an encoder 17 which is coupled to the belt 12 and signals the LED as to precise movement of the belt, a new image frame that is charged by corona charger 34 has charge thereon selectively erased in accordance with the programmed instructions recorded on the disk. Such instructions provide the LED printer with data to print representing modifications of the optical image, such as erase of an area or of certain pixel locations. Such erase may be provided on each of two image frames to have one selected portion of the area colored with one colored toner and another selected portion of the area colored with a different colored toner. After exposure by the LED printer the optical exposure of the document may be made on one or more or the same image frame(s) to further modulate the charge on the image frame(s) with image information from the original document, D, that is now placed on the platen 20 and exposed using lamps 22.

The respective image frames are developed, as discussed above, and the developed images transferred to a surface of copy sheet S.

Thus, there has been provided an improved image editing station that facilitates selection and modification of the image to be edited. While the station has been shown as being remote, it may be incorporated as part of the copier and a single disk drive is used. The copier may be of the type which employs an electro-optical device such as a laser or LED printhead to print the original data as well as the edited data. The scanner could thus be used to store the data on the original document for printing as well as editing. In lieu of a disk, the adjusted data may be stored on a battery backed/flash memory card.

The invention has been described in detail with particular reference to preferred embodiments thereof, but it will be understood that variations and modifications can be effected within the spirit and scope of the invention.

I claim:

1. A method for producing copy said method comprising the steps of:
    scanning a document to be edited at a high resolution to generate signals representing image data on the document;

storing, in a high resolution storage memory, the data at a first high resolution;

displaying the data on a display at a second lower resolution;

storing the data for display at the lower resolution;

designating an area on the display for selective editing;

in response to a designation of an area, extracting data specific to said area from said high resolution storage memory and modifying said data for viewing on said display at a higher resolution than said second resolution;

adjusting data in said designated area for editing and generating adjusted data;

storing said adjusted data; and reproducing the document on a copier with editing thereof being in accordance with said adjusted data.

2. The method of claim 1 and including the steps of supporting a document upon a platen;

exposing an optical image of the document upon a photoconductive member that is electrostatically charged to form an image of the document; and electro-optically modifying the charge on the photoconductive member in response to said adjusted data.

3. The method of claim 2 and including the steps of developing the image formed with toner and transferring the toner to a copy sheet.

4. The method of claim 3 and including the steps of developing the image with differently colored toners to form a plural color reproduction.

5. A data editing station for providing editing data for a copier, said station comprising:

scanner means for scanning a document to be edited at a high resolution and generating signals representing image data on the document;

memory means for storing the data at a first high resolution;

a display for displaying the data at a second lower resolution;

memory means for storing the data for display at the lower resolution;

means for designating an area on the display for selective editing;

means responsive to a designation of an area for extracting data specific to said area from said high resolution memory means and modifying said data for viewing on said display at a higher resolution than said second resolution;

means for adjusting data in said designated area for editing; and means for storing said adjusted area.

6. The editing station of claim 5 in combination with an electrophotographic copier, the copier including a platen for exposing an optical image of a document upon a photoconductive member that is electrostatically charged to form an image of the document and electro-optical means for modifying the charge on the photoconductive member in response to data stored in said means for storing said adjusted data.

7. The editing station of claim 6 wherein said means for storing said adjusted data comprises a magnetic data storage disk.

8. A method for producing copy, said method comprising the steps of:

scanning a document to be edited to generate signals representing image data on the document;

storing, in a high resolution storage memory, the data at a first high resolution;

storing the data at a second lower resolution;

displaying the data on a display at the second lower resolution;

designating an areal portion of the display for selective editing;

in response to a designation of an areal portion, extracting data specific to said areal portion from said high resolution storage memory and modifying said data for viewing on said display at a higher resolution than said second resolution;

inputting signals for editing said designated areal portion and generating adjusted data representing an edited version of said areal portion;

storing said adjusted data; and reproducing the document with editing thereof being in accordance with said adjusted data.

* * * * *